March 6, 1956    H. KLAUCKE    2,737,264
LUBRICATOR FOR CHAINS
Filed Oct. 9, 1952
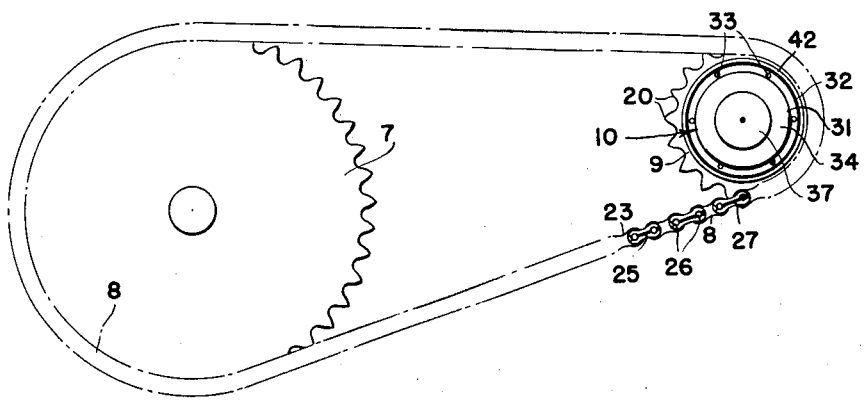
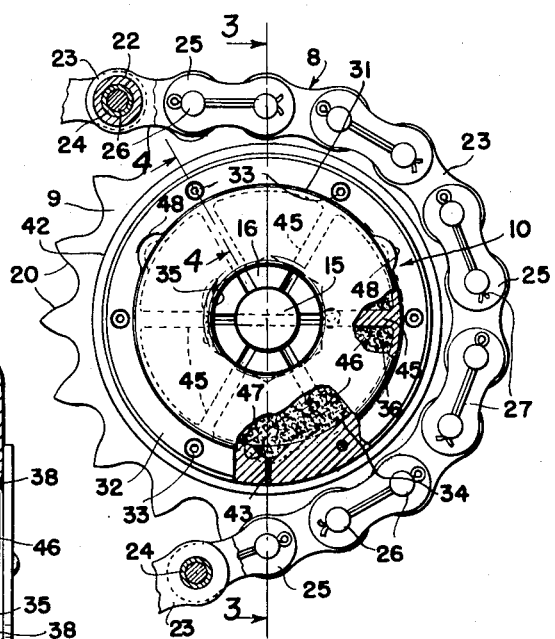
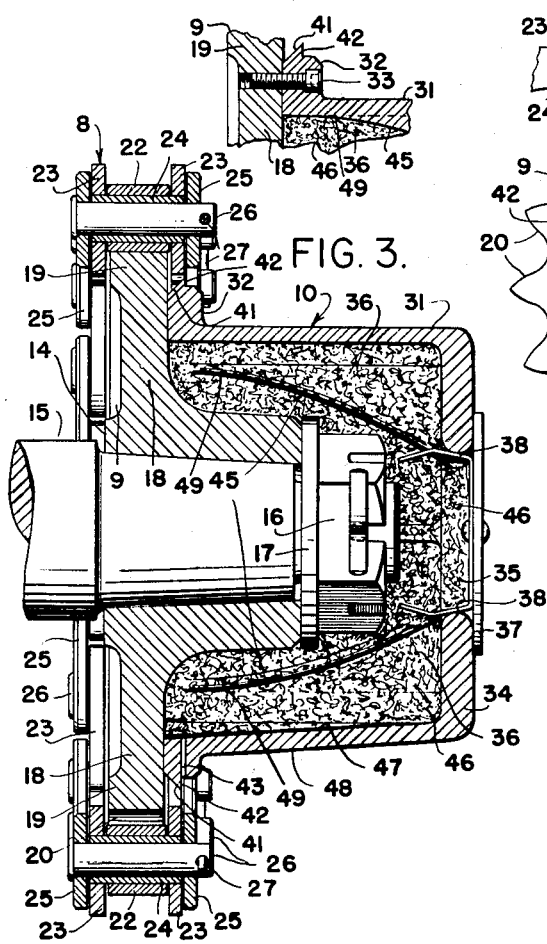
HERMANN KLAUCKE
*INVENTOR.*
BY *W. D. O'Connor*
ATTORNEY

United States Patent Office 2,737,264
Patented Mar. 6, 1956

2,737,264

LUBRICATOR FOR CHAINS

Hermann Klaucke, Worcester, Mass., assignor to Chain Belt Company, Milwaukee, Wis., a corporation of Wisconsin Application October 9, 1952, Serial No. 313,918

7 Claims. (Cl. 184—15)

This invention relates generally to lubricators for chains and the like and particularly to an improved automatic lubricator for power transmission chains and more especially for transmission chains of the roller type.

Power transmission chains of the roller type articulate about their sprockets through the pivoting action of pins journalled in bushings to form interconnections at the ends of the links, the rubbing or bearing surfaces of the pins and bushings being hardened and precision finished. To protect these bearing surfaces from deterioration, it is highly desirable that a lubricating film be maintained between the rubbing surfaces of the pins and the bushings to prevent surface contact and wearing action. In the absence of adequate lubrication, a chain may wear to the extent of becoming elongated and ceasing to fit the cooperating sprockets. Proper lubrication of transmission chain also serves to prevent rust and corrosion and provides a cushioning action in the joints to reduce noise and shock. The application of lubricant to chains is generally accomplished manually through applying oil to the chain by means of a brush or oil can. However, this method is often unsatisfactory since it is inherently haphazard and usually results in an insufficient amount of oil reaching the bearing surfaces between the pins and the bushings. Similarly, when oil is applied to the chain by way of the sprocket, the exterior of the chain may be coated with oil but very little may reach the vital bearing surfaces inside the bushings.

It is therefore a general object of the present invention to provide an improved automatic lubricator for power transmission chains of the roller type.

Another object of the invention is to provide an improved lubricator for roller chains that is simple in construction and is automatic and dependable in operation.

Another object is to provide an improved automatic lubricator that is especially adapted to direct lubricant to the pin bearings of roller chain.

Another object is to provide an automatic lubricator for roller chains so arranged that the lubricant is applied to the chain in the region between overlapping alternate side plates to facilitate the flow of lubricant into the chain pin bearings.

Another object is to provide an improved automatic chain lubricator especially adapted to operate under adverse conditions and in relatively inaccessible positions to properly lubricate and thereby lengthen the useful life of a transmission chain.

A further object is to provide an improved chain lubricator adapted for attachment to a chain carrying sprocket and so arranged that it may be filled with lubricant in any position of rotation of the sprocket.

According to this invention, the improved lubricator for roller chains is arranged to be fastened on one face of a sprocket carrying the chain to be lubricated. The new lubricator is in the form of a cup-like housing constituting a lubricant reservoir and that is provided on its periphery with a circumferentially arranged slinger lip. To insure delivering lubricant to the pin bearings of the chain, the slinger lip is positioned to lie in a radial plane spaced outwardly from the face of the sprocket sufficiently to bring it into alignment with the space between the overlapping side plates at one side of the chain. Small metering openings are provided to deliver limited quantities of lubricant from the reservoir within the housing to the slinger lip. The lubricant then flows tangentially along the slinger lip and collects thereon at intervals in small drops which are thrown by centrifugal force into the space between the side plates of the chain. The exterior of the housing is so arranged that lubricant will not be thrown from any part thereon except the slinger lip, the drops thrown therefrom striking the chain precisely at the juncture of the overlapping side plates and being urged by centrifugal force between the plates to the chain pin bearings. Positive automatic lubrication of the chain is thereby effected whenever the drive is in operation, the delivery of lubricant ceasing automatically when the sprocket stops rotating. The lubricant reservoir is filled through an opening axially disposed at its outer end and always accessible regardless of the position of rotation of the sprocket, the interior of the housing being supplied with absorbent wicking which retains and filters the lubricant.

The foregoing and other objects of this invention will become more fully apparent as the following detailed description of an exemplary embodiment thereof in an improved lubricator is read in conjunction with the accompanying illustrative drawing, wherein:

Figure 1 is a view in elevation of a roller chain and sprocket drive mechanism provided with a lubricator embodying the present invention shown mounted on the face of the smaller of the two sprockets;

Fig. 2 is an enlarged view of the smaller sprocket and part of the chain shown in Fig. 1 together with the improved lubricator, the dust cap having been removed and parts broken away to disclose interior details;

Fig. 3 is a view in axial section through the sprocket and attached lubricator, taken on the plane represented by the line 3—3 in Fig. 2; and, Fig. 4 is a fragmentary view in axial section taken on the plane represented by the line 4—4 in Fig. 2.

The particular embodiment of the invention set forth herein by way of an exemplification of a practical lubricant dispensing structure, is illustrated as applied as an attachment to a roller chain and sprocket drive mechanism such as is used for example in the final drive train of a motor truck or other vehicle, although it is to be understood that the improved lubricator may be applied with equal advantage to various other transmission mechanisms of the chain and sprocket type.

The representative drive mechanism illustrated in Fig. 1 comprises a relatively large toothed sprocket 7 to which power is transmitted by a roller chain 8 from a relatively small driving sprocket 9. In this instance, the smaller sprocket 9 carries on its outer face an improved chain lubricator 10 embodying the present invention. As best shown in the sectional view, Fig. 3, the small driving sprocket 9 comprises a central hub portion 14 that is taper bored internally to fit on the correspondingly tapered end of a horizontally disposed jack shaft 15 that supports and drives the sprocket. The sprocket is held on the shaft by a retaining nut 16 that is threaded on the outer end of the shaft in the usual manner and cooperates with a washer 17 to press the hub 14 on to the tapered shaft portion. The outer surface of the hub 14 blends into a radially extending, integral plate or disc 18 the periphery of which is thickened to form a rim 19 that is cut to present sprocket teeth 20 properly shaped to cooperate with the roller chain 8.

As shown in the drawing, the roller chain 8 comprises alternately arranged pin links and roller links that carry a plurality of tooth engaging rollers 22 of the proper size and spacing to engage and fit between adjacent teeth 20 of the sprocket 9. Adjacent spaced rollers 22 are carried in pairs by the roller links each of which consists of a pair of inner side plates 23 arranged to straddle an intervening sprocket tooth 20 and joined at each end by a transverse hollow bushing 24 that passes through and serves as a journal for one of the rollers 22. The bushings 24 are pressed into holes in the ends of the side plates 23 in a manner to constitute therewith a rigid unitary structure consisting of the two side plates joined at both their ends by the two bushings and rotatably carrying two spaced rollers.

Successive roller links are in turn joined together for articulation by means of pin links each constituted by a pair of outer side plates 25 overlapping the inner side plates 23 and having holes at their ends receiving pins 26 which pass through and are journaled in the hollow bushings 24 at the adjacent ends of the roller links. The pins 26 may be held in place by split cotters 27 passing through holes in their ends, or they may be pressed into and secured by riveting in the holes in the ends of the side plates 25. By reason of the rotatable connection between the roller links and the alternate pin links afforded by journaling the pins 26 within the hollow bushings 24, the chain 8 is arranged to flex or articulate in running over the sprockets 7 and 9, the relative pivoting movement of the links occurring at the bearing surfaces between the pins and the interior of the bushings with the rollers 22 rotating on the exterior of the bushings.

Since the bearing surfaces between the pins, the bushings and the rollers are all highly polished, it is important that they be properly lubricated during operation of the chain to provide an interposed oil film that protects them from metallic contact thereby minimizing wear between the parts and cushioning the action as the chain runs over the sprockets. Failure to effect proper lubrication of the pin bearings in particular results in rapid wearing action between the pins and the bushings. This causes increased clearances to occur and the chain to become elongated to such an extent that in a short time it will not properly cooperate with the teeth of the sprocket and will have to be replaced by a new chain. When lubricant such as oil is applied manually by a brush or oil can or like means to the exterior of a roller chain, the chain may give the appearance of having been well lubricated yet very little, if any oil may have found its way into the chain pin bearing where it is most needed. Likewise, when oil is applied by way of the sprocket, it passes from the sprocket teeth to the chain rollers to lubricate them but must then travel a very circuitous path to reach the pin bearings. Furthermore, as is well known, manual lubrication is inherently intermittent and uncertain.

The improved chain lubricator provided by the present invention overcomes the shortcomings of previously used lubricating methods by providing continuous automatic lubrication directly to the pin bearings of the chain whenever and only when the sprocket on which it is mounted is rotating. To this end, the improved lubricator 10 is arranged to apply oil to the chain at the most favorable position, which is in the space between the inner side plates 23 and the overlapping outer side plates 25 at one side of the chain, whereupon centrifugal force causes the oil to flow directly to the pin bearings in adequate quantities.

As shown in the drawing, the improved lubricator 10 embodying the present invention comprises essentially a cup-like body or housing 31 of generally cylindrical shape presenting at one end a radial flange 32 that is disposed to abut against the outer face of the sprocket 9. Cap screws 33 pass through countersunk holes in the flange 32 at angularly spaced intervals and are threaded into corresponding tapped holes in the disc 18 to secure the housing 31 to the sprocket 9, the heads of the screws being fully recessed within the countersunk holes as best shown in Fig. 4. The housing 31 is partially closed at its outer end by a transverse wall 34 which presents a central coaxially disposed aperture that constitutes a filler or spout opening 35, the arrangement being such that the housing 31 cooperates with the sprocket 9 to form therebetween a chamber or reservoir 36 for retaining a quantity of oil or other lubricant. The spout opening 35, being centrally positioned on the axis of the sprocket, is always in the proper position for receiving additional lubricant regardless of the position of rotation of the sprocket at the time the lubricant is introduced.

After the reservoir 36 has been filled, the filler opening 35 may be closed by means of a lid or dust cap 37 that is held in position by flat spring fingers 38 that spring outwardly into engagement with the inner margin of the opening 35 to retain the cap in place while permitting ready removal thereof. With the heads of the cap screws 33 countersunk in the flange 32, as shown in Fig. 4, and with the exterior of the housing 31 and the cap 37 otherwise smooth and free from projections, there are no extraneous points forming accidental slingers which might operate to collect and throw about random drops of oil that happen to be spilled on or otherwise accumulated on the outside of the lubricator.

For delivering oil by centrigual force to the chain while the sprocket is rotating, the periphery of the flange 32 is beveled or sharpened at its sprocket side to form an inclined surface 41 terminating in a circumferentially disposed sharp edge or knife-like lip that constitutes an annular oil slinger 42. As best shown in Fig. 3, the circumferentially disposed slinger lip 42 lies in a radial plane spaced outwardly from the face of the sprocket 9 just far enough to coincide with the radial plane through the space between the inner side plates 23 and the outer side plates 25 of the chain. When the sprocket 9 is rotating, any oil accumulating on the exterior of the flange 32 in the region of the sprocket face flows by centrifugal force along its beveled periphery 41 to the slinger lip 42 and away from the sprocket.

Oil from within the reservoir 36 is dispensed in metered quantities under the action of centrifugal force through metering openings or oil holes 43 which extend radially outward through the flange 32 from the interior of the housing to the slinger lip 42. To insure against the holes 43 becoming clogged with road dust or the like they are preferably made at least as large as 1⁄16 of an inch in diameter, the total amount of oil dispensed being governed by the number of holes provided, the number in the present instance being limited to three as shown in Fig. 2.

The interior of the housing 31 is subdivided and reinforced by a plurality of angularly spaced radial webs 45 as shown in Figs. 2 and 3, there being in this particular instance six webs dividing the reservoir into six compartments. In addition to reinforcing the housing, the webs 45 serve to retain in the compartments between them a quantity of absorbent material or wicking 46 such as cotton batting, wool felt or the like which becomes saturated with and acts as a filter for the lubricant supplied to the reservoir through the spout opening 35. To facilitate the flow of oil from the absorbent material 46 into the oil holes 43 leading to the slinger lip 42, the inner surface of the housing 31 is provided with three axially disposed tapered oil channels in the form of flutes or grooves 47 that lead respectively to the three oil holes 43, the arrangement being such that centrifugal force causes oil to flow into the grooves and to flow along their tapered surfaces or channels toward the inner end of the housing and into the associated oil holes 43.

As may be seen in the drawing, in order to form the grooves 47 in the inner surface of the housing 31, the outer surface is bulged outward forming raised ribs or ridges 48 which taper correspondingly from the flange 32 toward the outer end of the housing. Just as the grooves 47 serve to guide the flow of oil on the inside of the housing, the tapered ribs 48 on the outside tend to accumulate any oil that may be spilled on the housing and guide it under centrifugal force along their tapered surfaces toward the flange 32. Although the oil dispensing channels 47 are provided in only three of the six compartments formed between the webs 45, the oil retained in the other three compartments gradually finds its way around the inner ends 49 of the webs (Fig. 4) in the region of the face of the sprocket disc 18 and into the adjacent compartments in a manner to equalize the amount of oil in all compartments.

The small quantity of filtered oil which oozes continuously from the oil holes 43 under the urging of centrifugal force during operation flows onto and forms a film on the periphery of the flange 32. The oil film extends circumferentially of the flange and wets the entire periphery thereof in the region of the oil slinger lip 42. Under centrifugal force, some of the oil of the film gathers at intervals into small drops at random angular positions on the sharp edge of the slinger lip 42 and the drops are thrown tangentially therefrom in the plane of rotation. The oil film is maintained continuously by the seepage of oil from the oil holes 43 and successively detached drops therefrom strike the chain in the region of the space between the inner side plates 23 and the outer side plates 25 at the side of the chain running along the outer face of the sprocket 9.

As previously explained, oil thus delivered to the space between the chain side plates continues its outward flow under centrifugal force as the chain travels around the sprockets and a substantial amount of oil finds its way to the pin bearings between successive chain links thereby providing adequate lubrication of these bearings. Oil on the links which does not flow directly into the pin bearings tends to saturate the surface of the chain and a sufficient amount of the oil finds its way to the rollers 22 to lubricate their bearings and the teeth 20 of the sprocket. By this arrangement, the oil is delivered to the part of the chain most in need of lubrication and any excess oil serves to saturate other parts of the chain to provide secondary lubrication and prevent corrosion.

Any oil which may spill on the outside of the housing, as might occur during filling of the reservoir or from leakage around the cap 37, is caused to flow by centrifugal force along the tapered ribs or ridges 48 on the outer surface of the housing 31, as previously mentioned, toward the flange 32. Since the exterior of the housing does not present filler caps, retaining screw heads or other projections which might operate as undesired oil slingers, oil on its exterior is not thrown about indiscriminately but finds its way to the slinger lip 42 and joins with the oil of the film thereon for feeding to the chain as described.

The capacity of the lubricant reservoir 36 within the housing 31 is preferably such that a single filling with oil will be sufficient to last throughout a day's operation. Since the oil is dispensed through the metering openings 43 under centrifugal force only while the sprocket 9 is rotating, the flow of oil ceases when the machine is not operating, the oil in the small metering holes 43 being retained therein by capillary action operating against the force of gravity. Consequently there is no dripping or leakage of oil from the lubricator 10 when the drive mechanism is not in operation. When it is desirable to substitute fresh wicking within the reservoir 36, the used wicking 46 may be removed readily through the filler opening 35 and the new wicking placed in position in the compartments between the various pairs of reinforcing webs 45.

From the foregoing explanation of the operation of the improved chain lubricator embodying the present invention it is apparent that there has been provided a simple and dependable lubricating apparatus which functions to deliver lubricant in metered quantities to a transmission chain in such a manner that the lubricant enters between the chain side plates and flows by centrifugal action directly to the chain pin bearings to thereby maintain an oil film between the relatively moving bearing surfaces of the pins and bushings that provide for articulation of the chain around its cooperating sprockets. Adequate lubrication of the pin bearings as thus provided prevents damage to their cooperating surfaces, thereby minimizing wear in the chain joints and greatly increasing the operating life of the chain.

Although only a single embodiment of the invention has been described by way of a full disclosure of a preferred illustrative structure, it is to be understood that the particular lubricator set forth in detail constitutes only one exemplification of the invention and that the advantages thereof may be achieved through the use of other physical structures perhaps adapted to different particular chain transmission mechanisms, without departing from the spirit and scope of the invention as defined by the subjoined claims.

An exemplary embodiment of the invention having now been fully set forth, I claim as my invention:

1. Apparatus for supplying lubricant to the chain joint openings between the links of a sprocket chain running over a sprocket, comprising a member mounted on the sprocket having faces converging in an annular slinger edge spaced from the side of the sprocket and in radial alignment with the opening in the chain joint, and means supplying lubricant in small quantities to one of the faces of said member adjacent said edge, whereby it may flow on the face to the edge and be thrown from the edge into the chain joint as the chain articulates around the sprocket.

2. In a lubricator for power transmitting chain of the type operating over a sprocket and having overlapping inner and outer side plates connected by pin bearings, a generally cylindrical lubricant housing adapted to be secured to a sprocket concentrically therewith, said housing having a flange arranged to engage and be attached to one face of the sprocket and presenting on its periphery a knife-like annular oil slinger lip spaced outwardly from the sprocket face a sufficient distance to be disposed in the radial plane of rotation which passes between the inner and the outer side plates of the chain running over the sprocket, said housing being provided with lubricant dispensing metering passages leading from the interior thereof to said slinger lip and with a lubricant receiving opening disposed coaxially thereof in its outer end, the arrangement being such that said housing may be filled with lubricant through said coaxial end opening regardless of the position of rotation of the supporting sprocket and that the lubricant may be dispensed therefrom whenever the sprocket is rotating through action of centrifugal force in feeding the lubricant outward through said metering openings and then throwing it tangentially from said annular slinger lip into the space between the inner and the outer side plates of the chain to lubricate the pin bearings thereof.

3. In a chain lubricator, a substantially cylindrical housing constituting a lubricant chamber provided internally with axially disposed reenforcing webs and axially extending lubricant grooves and having radially extending lubricant passages leading from said grooves to the exterior of said chamber, a flange formed circumferentially on said housing and presenting on its periphery a lubricant slinging lip positioned to receive lubricant from said radially extending passages and arranged to deliver the lubricant in the form of centrifugally thrown drops when said housing is rotated, and absorbent material disposed between said webs within said housing to retain and filter a supply of lubricant, the arrangement being such that a chain operating in radial relationship with said slinging lip is supplied with lubricant in metered quantities.

4. In an automatic lubricator for a power transmission chain of the roller type having overlapping inner and outer side plates connected by chain pin bearings for operating over a sprocket, a generally cylindrical housing constituting a lubricant retaining chamber arranged to be attached to a sprocket concentrically thereof and having lubricant dispensing metering passages leading from the interior lubricant chamber to the periphery thereof and a lubricant receiving or filling opening disposed coaxially of said housing in the outer end thereof, and a flange disposed circumferentially of said housing in position to abut and be attached to the face of the sprocket and presenting on its periphery an annular oil slinger lip disposed outwardly from the sprocket a sufficient distance to position it in a radial plane of rotation passing between the inner and the outer side plates of the chain operating over the sprocket, said lubricant dispensing passages leading to said annular oil slinger lip, the arrangement being such that said chamber may be filled with lubricant through said coaxially disposed filling opening regardless of the position of rotation of the sprocket and that lubricant dispensed therefrom through said metering openings may flow onto and be thrown from said annular slinger lip by centrifugal force into the spaces between the inner and the outer side plates of the chain to lubricate the chain pin bearings whenever the sprocket is rotating.

5. In a lubricator for a roller chain having overlapping inner and outer side plates connected by chain pins to form links running over the rim of a sprocket wheel, a housing of cup shape adapted to be secured to a face of a sprocket to constitute therewith a closed chamber for lubricant, and a flange formed circumferentially on said housing and presenting on its periphery a sharp edge forming a slinger lip disposed in spaced relationship with the sprocket rim and sufficiently outward thereof to lie in the radial plane passing between the inner and the outer side plates of the adjacent side of the roller chain running over the sprocket, said flange being provided with lubricant passageways communicating with the interior of said lubricant chamber and serving to deliver lubricant in limited quantities to said slinger lip, the arrangement being such that when the chain is running over the sprocket lubricant is thrown from said slinger lip into the spaces in the chain between the inner and the outer side plates to lubricate the chain pins.

6. In a lubricator for a power transmitting chain of the pin and side plate type operating over a sprocket, a lubricant reservoir adapted to be secured to and rotate with the chain sprocket and presenting on its periphery a circumferentially disposed slinger lip spaced from the sprocket in position to dispense drops of lubricant into the spaces between the side plates of a chain to lubricate the chain pin bearings, said reservoir being provided with internal grooves leading to metering openings for feeding lubricant in limited quantities from its interior to said slinger lip.

7. In a lubricator for power transmission mechanism of the chain and sprocket type including a sprocket and a cooperating chain of side plate and pin construction, a generally cylindrical housing adapted to be secured at one end to one face of the sprocket to constitute therewith a lubricant receiving chamber and provided at its other end with a coaxially disposed filling opening, said housing being also provided with internal tapered grooves leading to radial metering passages for dispensing lubricant in limited quantities under centrifugal force, there being formed circumferentially of said housing an encircling slinger lip disposed to receive lubricant discharged through said metering passages and positioned to throw drops of lubricant by centrifugal force between the side plates of one side of the chain operating over the sprocket, whereby lubricant may enter between the side plates and flow into the chain pin bearings.

References Cited in the file of this patent

UNITED STATES PATENTS

| | | |
|---|---|---|
| 782,276 | Roebling | Feb. 14, 1905 |
| 1,914,093 | Adams | June 13, 1933 |